US006303212B1

(12) United States Patent
Shaw-Klein et al.

(10) Patent No.: US 6,303,212 B1
(45) Date of Patent: Oct. 16, 2001

(54) INK JET RECORDING ELEMENT

(75) Inventors: Lori Shaw-Klein; Peter J. Ghyzel, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/394,420

(22) Filed: Sep. 13, 1999

(51) Int. Cl.[7] ............................... B32B 27/14; B32B 3/00

(52) U.S. Cl. ....................... 428/195; 428/211; 428/478.2; 428/478.8; 428/479.6; 428/500; 347/105

(58) Field of Search .................................... 428/195, 211, 428/500, 478.2, 478.8, 479.6; 347/105

(56) References Cited

U.S. PATENT DOCUMENTS

| | | |
|---|---|---|
| 4,547,405 | 10/1985 | Bedell et al. . |
| 5,916,673 | 6/1999 | Fryberg et al. . |

*Primary Examiner*—Bruce H. Hess
*Assistant Examiner*—B. Shewareged
(74) *Attorney, Agent, or Firm*—Harold E. Cole

(57) ABSTRACT

An ink jet recording element comprising a support having thereon an image-recording layer comprising a binder and a polymeric mordant, the image-recording layer providing a total concentration of charged polymeric binding sites greater than about $3\times10^{26}/m^3$, and the image-receiving layer having a concentration of salts providing charges, opposite to the charge of the binding sites, of less than about $5.8\times10^{26}$ charges/$m^3$, the salt having a molecular weight of less than 10,000 grams/mole.

10 Claims, No Drawings

INK JET RECORDING ELEMENT

FIELD OF THE INVENTION

The present invention relates to an ink jet image-recording element which yields printed images with excellent image stability over a wide range of humidity conditions.

BACKGROUND OF THE INVENTION

In a typical ink jet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water, an organic material such as a monohydric alcohol, a polyhydric alcohol or mixtures thereof.

An ink jet recording element typically comprises a support having on at least one surface thereof an ink-receiving or image-recording layer, and includes those intended for reflection viewing, which have an opaque support, and those intended for viewing by transmitted light, which have a transparent support. Medical images, such as radiographic images, are typically viewed on a blue transparent support.

While a wide variety of different types of image-recording elements for use with ink jet devices have been proposed heretofore, there are many unsolved problems in the art and many deficiencies in the known products which have severely limited their commercial usefulness. The requirements for an image recording medium or element for ink jet recording are very demanding.

It is well known that in order to achieve and maintain photographic-quality images on such an image-recording element, an ink jet recording element must:

- Be readily wetted so there is no puddling, i.e., coalescence of adjacent ink dots, which leads to nonuniform density
- Exhibit no image bleeding
- Provide maximum printed optical densities
- Exhibit the ability to absorb high concentrations of ink and dry quickly to avoid elements blocking together when stacked against subsequent prints or other surfaces
- Provide a high level of gloss and avoid differential gloss
- Exhibit no discontinuities or defects due to interactions between the support and/or layer(s), such as cracking, repellencies, comb lines and the like
- Not allow unabsorbed dyes to aggregate at the free surface causing dye crystallization, which results in bloom or bronzing effects in the imaged areas
- Have an optimized image fastness to avoid fade from contact with water or radiation by daylight, tungsten light, or fluorescent light
- Provide image stability under high-humidity conditions Image stability is an important concern for inkjet prints. In particular, dyes used in the printing process may continue to migrate over time during storage of a printed image. The migration process typically occurs more quickly under conditions of high relative humidity since inkjet dyes are water soluble and materials used to manufacture inkjet media are often easily plasticized by water. Within a given dye set, the individual dyes may migrate or bleed at different rates due to differences in solubility or molecular dimensions. As a result, areas which are originally printed as neutral densities may acquire a colored tint over time. Such a phenomenon is especially objectionable in a medical application such as a radiographic image, since a neutral gray scale is expected and a colored tint is typically unacceptable in any area of the print.

U.S. Pat. No. 4,547,405 relates to an ink jet receiver comprising an ink jet recording layer which contains a polymeric latex of a block copolymer of polyvinyl alcohol and polyvinyl (benzyl ammonium chloride). However, there is a problem with this material in that, under high humidity conditions, the image stability is not as good as one would like.

Other prior art references such as U.S. Pat. No. 5,916,673 discloses that trivalent salts or ions of Group IIIb metals may be added to ink jet recording sheets for the purpose of improving waterfastness of images without compromising lightfastness. However, it has been found that such salts or ions of metals in reality actually contribute to poorer color stability under high humidity conditions.

It is an object of this invention to provide an ink jet receiver in which the color does not shift under high humidity conditions.

SUMMARY OF THE INVENTION

These and other objects are achieved in accordance with the invention which comprises an ink jet recording element comprising a support having thereon an image-recording layer comprising a binder and a polymeric mordant, the image-recording layer providing a total concentration of charged polymeric binding sites greater than about $3\times10^{26}/m^3$, and the image-receiving layer having a concentration of salts providing charges, opposite to the charge of the binding sites, of less than about $5.8\times10^{26}$ charges/$m^3$, the salt having a molecular weight of less than 10,000 grams/mole.

By use of the invention, an image can be produced which has improved image stability under high humidity conditions.

DETAILED DESCRIPTION OF THE INVENTION

In accordance with the invention, it has been found that a specific combination of minimum mordant content and maximum ionic content must be simultaneously satisfied in order to eliminate objectionable color shift under high humidity conditions. This invention is useful in inkjet receivers which are comprised primarily of swellable polymers or those which are comprised primarily of inorganic particles.

In a preferred embodiment of the invention, the concentration of salts providing charges, opposite to the charge of said binding sites, is less than about $1.0\times10^{26}$ charges/$m^3$. In another preferred embodiment of the invention, the concentration of salts providing charges, opposite to the charge of said binding sites, is less than about $5.0\times10^{24}$ charges/$m^3$.

Any polymeric mordant can be used in the image-recording layer of the invention provided it has the binding site concentration noted above. For example, there may be used a cationic polymer, e.g., a polymeric quartenary ammonium compound, or a basic polymer, such as poly(dimethylaminoethyl)-methacrylate, polyalkylenepolyamines, and products of the condensation thereof with dicyanodiamide, amine-epichlorohydrin polycondensates; lecithin and phospholipid compounds. Examples of mordants useful in the invention include: vinylbenzyl trimethyl ammonium chloride/ethylene glycol dimethacrylate; vinylbenzyl trimethyl ammonium chloride/ divinyl benzene; poly(diallyl dimethyl ammonium chloride); poly(2-N,N,N-trimethylammonium)ethyl methacrylate methosulfate; poly(3-N,N,N-trimethylammonium) propyl methacrylate chloride; a copolymer of vinylpyrrolidinone and vinyl(N-methylimidazolium chloride; and hydroxyethylcellulose derivitized with (3-N,N,N-trimethylammonium) propyl chloride. In a preferred embodiment, the mordant is a polymeric quaternary ammonium compound.

During the synthesis of the polymeric mordant, impurities may be introduced in the form of salts. Examples of the source of these salts include the starting reagents, by-products of pH adjustment and undesired side reactions. It has been found that when the amount of these salts is reduced to a certain level, then improved image stability under high humidity conditions can be obtained.

In a preferred embodiment of the invention, the binder is a hydrophilic material. Such hydrophilic materials include naturally-occurring hydrophilic colloids and gums such as gelatin, albumin, guar, xantham, acacia, chitosan, starches and their derivatives, functionalized proteins, functionalized gums and starches, and cellulose ethers and their derivatives, polyvinyloxazoline and polyvinylmethyloxazoline, polyoxides, polyethers, poly(ethylene imine), poly(acrylic acid), poly(methacrylic acid), n-vinyl amides including polyacrylamide and polyvinylpyrrolidone, and poly(vinyl alcohol), its derivatives and copolymers. In a preferred embodiment, the hydrophilic binder is gelatin.

The hydrophilic material which may be employed in the image-recording layer may be present in any amount which is effective for the intended purpose. In general, it may be present in an amount of from about 0.5 to about 20 g/m$^2$, which corresponds to a dry thickness of about 0.5 to about20 $\mu$m.

If the image-recording layer is a porous layer comprising particles, the void volume must be sufficient to absorb all of the printing ink. For example, if a porous layer has 60 volume % open pores, in order to absorb 32 cc/m$^2$ of ink, it must have a physical thickness of 54 $\mu$m.

Matte particles may be added to any or all of the layers described in order to provide enhanced printer transport, or resistance to ink offset. In addition, surfactants, defoamers, or other coatability-enhancing materials may be added as required by the coating technique chosen. Crosslinkers may also be added to the layers in order to impart improved mechanical properties or resistance to dissolution.

Another embodiment of the invention relates to an ink jet printing process comprising:

a) providing an ink jet recording element as described above, and b) applying liquid ink droplets thereon in an image-wise manner.

Any support or substrate may be used in the recording element of the invention. There may be used, for example, plain or calendered paper, paper coated with protective polyolefin layers, polymeric films such as polyethylene terephthalate, polyethylene naphthalate, poly 1,4-cyclohexane dimethylene terephthalate, polyvinyl chloride, polyimide, polycarbonate, polystyrene, or cellulose esters. In particular, polyethylene-coated paper or poly(ethylene terephthalate) is preferred.

The support is suitably of a thickness of from about 50 to about 500 $\mu$m, preferably from about 75 to 300 $\mu$m. Antioxidants, antistatic agents, plasticizers, dyes, pigments and other known additives may be incorporated into the support, if desired.

In order to improve the adhesion of the image-recording layer to the support, the surface of the support may be subjected to a corona-discharge treatment prior to applying the image-recording layer.

Optionally, an additional backing layer or coating may be applied to the backside of a support (i.e., the side of the support opposite the side on which the image-recording layers are coated) for the purposes of improving the machine-handling properties and curl of the recording element, controlling the friction and resistivity thereof, and the like.

Typically, the backing layer may comprise a binder and a filler. Typical fillers include amorphous and crystalline silicas, poly(methyl methacrylate), hollow sphere polystyrene beads, micro crystalline cellulose, zinc oxide, talc, and the like. The filler loaded in the backing layer is generally less than 5 percent by weight of the binder component and the average particle size of the filler material is in the range of 5 to 30 $\mu$m. Typical binders used in the backing layer are polymers such as acrylates, gelatin, methacrylates, polystyrenes, acrylamides, poly(vinyl chloride)poly(vinyl acetate) co-polymers, poly(vinyl alcohol), cellulose derivatives, and the like. Additionally, an antistatic agent also can be included in the backing layer to prevent static hindrance of the recording element. Particularly suitable antistatic agents are compounds such as dodecylbenzenesulfonate sodium salt, octyl-sulfonate potassium salt, oligostyrenesulfonate sodium salt, laurylsulfosuccinate sodium salt, and the like. The antistatic agent may be added to the binder composition in an amount of 0.1 to 15 percent by weight, based on the weight of the binder. An image-recording layer may also be coated on the backside, if desired.

While not necessary, the hydrophilic film forming binders described above may also include a crosslinker. Such an additive can improve the adhesion of the ink receptive layer to the substrate as well as contribute to the cohesive strength and water resistance of the layer. Crosslinkers such as carbodiimides, polyfunctional aziridines, melamine formaldehydes, isocyanates, epoxides, and the like may be used. If a crosslinker is added, care must be taken that excessive amounts are not used as this will decrease the swellability of the layer, reducing the drying rate of the printed areas.

Coating compositions employed in the invention may be applied by any number of well known techniques, including dip-coating, wound-wire rod coating, doctor blade coating, gravure and reverse-roll coating, slide coating, bead coating, extrusion coating, curtain coating and the like. Known coating and drying methods are described in further detail in Research Disclosure no. 308119, published Dec. 1989, pages 1007 to 1008. Slide coating is preferred, in which the base layers and overcoat may be simultaneously applied. After coating, the layers are generally dried by simple evaporation, which may be accelerated by known techniques such as convection heating.

Ink jet inks used to image the recording elements of the present invention are well-known in the art. The ink compositions used in ink jet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946; 4,239,543 and 4,781,758, the disclosures of which are hereby incorporated by reference.

Although the recording elements disclosed herein have been referred to primarily as being useful for ink jet printers, they also can be used as recording media for pen plotter assemblies. Pen plotters operate by writing directly on the surface of a recording medium using a pen consisting of a bundle of capillary tubes in contact with an ink reservoir.

The following examples are provided to illustrate the invention.

EXAMPLES

Example 1

Several commercial and non-commercial dye mordants were obtained to prepare elements of the invention, I-1 through I-5 and comparison elements C-2 through C-6 below. A comparison element C-1 was prepared which did not contain any mordant. All of the mordants were dialyzed or diafiltered with the intention of removing ions. The samples that were dialyzed were purified with a membrane manufactured by Spectrum Medical Industries, Inc. having a nominal molecular weight cutoff of 12,000 to 14,000 g/mole. The diafiltered sample was purified using a diafiltration membrane manufactured by Osmonics Inc. with a nominal molecular weight cutoff of 20,000 g/mole.

In some cases the dialysis process caused a pronounced decrease in solids content of the mordant dispersion and did not successfully reduce the amount of salt present per weight of mordant. Nevertheless, all the samples were tested for image stability under high humidity conditions.

The mordants were characterized for salt content by ion chromatography. The analytical method excludes molecules with molecular weights greater than 10,000 g/mole. Since the most common anion by a wide margin in all cases is chloride, this is reported in the table below as impurity charge. The impurity charge reported below reflects only chloride associated with molecules having molecular weights below 10,000 g/mole. Each of the mordants listed should normally contain some chlorine present as a counterion to the mordanting cationic groups, but the level measured was sufficiently high that it may be safely assumed that the levels measured are generally far in excess of any expected amount.

Each mordant was combined with photographic grade bone gelatin (Eastman Gelatine Co.) in deionized water to make a solution at 10% solids. The weight ratio of gelatin to mordant in every case was 75:25. Each melt was then bead coated on resin-coated paper which had been corona-discharge treated to improve adhesion. Simultaneously, an overcoat was applied from a 2% solids solution of methyl cellulose, Methocel A4C ®,(Dow Chemical Co.). The coated element was chill set at 5° C. and dried thoroughly by forced air heating. The final dry coverage of the gelatin/mordant base layer was 12.9 g/m$^2$; and the dry coverage of the overcoat was 0.81 g/m$^2$.

By knowing the mordant coverage and the excess chloride ion content of the mordant, concentration of excess chloride ion per cubic meter in the coated film was calculated for each case and reported as number of impurity charges/m$^3$. Coatings with charges/m$^3$ greater than $5.7\times10^{26}$ are reported as comparison examples (C).

A gray scale image was printed on each receiver using an Eastman Kodak 1200 Distributed Medical Imager. The image was allowed to dry under ambient office conditions and then incubated at 80% relative humidity, 21° C. for 72 hours. The cyan, magenta and yellow optical densities were measured at various neutral densities of 0.4, 0.7 and 1.3, before and after incubation, and the % increase for each calculated. The % increase in optical density is a convenient measure of the amount of dye migration for each of the dyes used to compose the image. An average of the increase in optical density at the three neutral densities was measured as follows:

TABLE 1

| Element | Mordant* | Impurity Charge (× $10^{26}$) per m$^3$ | % Increase In Density Cyan | Magenta | Yellow |
|---|---|---|---|---|---|
| C-1 | None | — | 13 | 29 | 37 |
| I-1 | VBTMAC/ DVB copolymer (diafiltered) | 0.01 | 4 | 3 | 10 |
| I-2 | VBTMAC/ DVB copolymer | 1.3 | 2 | 5 | 27 |
| I-3 | S/VBBA/DVB terpolymer (dialyzed) | 3.0 | 2 | 2 | 6 |
| I-4 | S/VBBA/DVB terpolymer | 3.5 | 2 | 0 | 7 |
| I-5 | Chemistat ® 6300H (dialyzed) | 5.7 | 3 | 11 | 32 |
| C-2 | Poly(diallyl dimethyl ammonium chloride) (dialyzed) | 6.7 | 15 | 52 | 53 |
| C-3 | Agefloc ® A50HV | 7.6 | 20 | 47 | 52 |
| C-4 | Chemistat ® 6300H | 7.7 | 6 | 24 | 52 |
| C-5 | Poly(diallyl dimethyl ammonium chloride) | 9.1 | 14 | 46 | 46 |
| C-6 | Agefloc ® A50HV (Dialyzed) | 9.9 | 20 | 49 | 54 |

VBTMAC/DVB: Latex copolymer of vinylbenzyl trimethylammonium chloride: divinyl benzene (87:13 molar ratio) prepared as in U.S. Pat. No. 3,958,995
S/VBBA/DVB: Latex terpolymer of styrene, vinylbenzyl dimethylbenzylamine and divinyl benzene (49.5:49.5:1.0 molar ratio) prepared as in U.S Pat. No. 3,958,995
Chemistat ® 6300H: Poly(vinylbenzyl trimethyl ammonium chloride), Sanyo Chemical Industries
Poly(diallyl dimethyl ammonium chloride): medium molecular weight, Sigma-Aldrich Fine Chemicals
Agefloc ® A50HV: Poly(hydroxypropyl dimethyl ammonium chloride), Ciba Specialty Chemicals Water Treatments, Inc.

The above results show that as the number of charges decreases, the % increase in density is reduced.

Example 2

In order to determine the minimum level of low-ionic concentration mordant required for effective reduction of color shift, three levels of dialyzed VBTMAC/DVB copolymer described above were coated in a gelatin binder. In each element, the bottommost ink absorbing layer comprised 7.5 g/m$^2$ deionized photographic grade pigskin gelatin (SBI), the middle dye mordanting layer comprised 7.5 g/m$^2$ of a combination of the same gelatin with the above described mordant, and the topmost overcoat comprised 0.54 g/m$^2$ methyl cellulose, Methocel A4C®, (Dow Chemical Co.) Gelatin/mordant weight ratios for the middle layer were 90/10, 80/20, and 70/30. From this information, the effective mordant (cationic groups) concentration per unit volume of the coated film was calculated and is reported as mordant charge per cubic meter.

A gray scale image was printed on each element using an Eastman Kodak 3600 Distributed Medical Imager. The elements were as tested as above with the following results:

TABLE 2

| Element | Mordant Charge ($\times 10^{26}$) per $m^3$ | % Increase In Density | | |
|---|---|---|---|---|
| | | Cyan | Magenta | Yellow |
| C-7 | 1.55 | 5 | 5 | 15 |
| I-6 | 3.10 | 2 | 2 | 10 |
| I-7 | 4.65 | 3 | 1 | 7 |

The above results show that as the number of charge sites increases, the % increase in density is reduced.

Although the invention has been described in detail with reference to certain preferred embodiments for the purpose of illustration, it is to be understood that variations and modifications can be made by those skilled in the art without departing from the spirit and scope of the invention.

What is claimed is:

1. An ink jet recording element comprising a support having thereon an image-recording layer comprising a binder and a polymeric mordant, said image-recording layer providing a total concentration of charged polymeric binding sites greater than about $3\times10^{26}/m^3$, and said image-recording layer having a concentration of salts providing charges, opposite to the charge of said binding sites, of less than about $5.8\times10^{26}$ charges/$m^3$, said salt having a molecular weight of less than 10,000 grams/mole.

2. The recording element of claim 1 wherein said concentration of salts providing charges, opposite to the charge of said binding sites, is less than about $1.0\times10^{26}$ charges/$m^3$.

3. The recording element of claim 1 wherein said concentration of salts providing charges, opposite to the charge of said binding sites, is less than about $5.0\times10^{24}$ charges/$m^3$.

4. The recording element of claim 1 wherein said binder is a hydrophilic polymer.

5. The recording element of claim 4 wherein said hydrophilic polymer is gelatin.

6. The recording element of claim 1 wherein said image-recording layer also contains an inorganic oxide.

7. The recording element of claim 1 wherein said polymeric mordant is a quaternary ammonium compound.

8. The recording element of claim 1 which contains a hydrophilic overcoat layer on top of said image-recording layer, said hydrophilic overcoat layer comprising a cellulose ether, poly(ethylene oxide) or poly(vinyl alcohol).

9. The recording element of claim 1 wherein said support is polyethylene-coated paper or poly(ethylene terephthalate).

10. An ink jet printing process comprising:

a) providing an ink jet recording element according to claim 1, and b) applying liquid ink droplets thereon in an image-wise manner.

* * * * *